Sept. 9, 1930.  H. MORGAN  1,775,623
LUBRICATING REAR AXLE DIFFERENTIAL
Filed Sept. 1, 1928  2 Sheets-Sheet 1
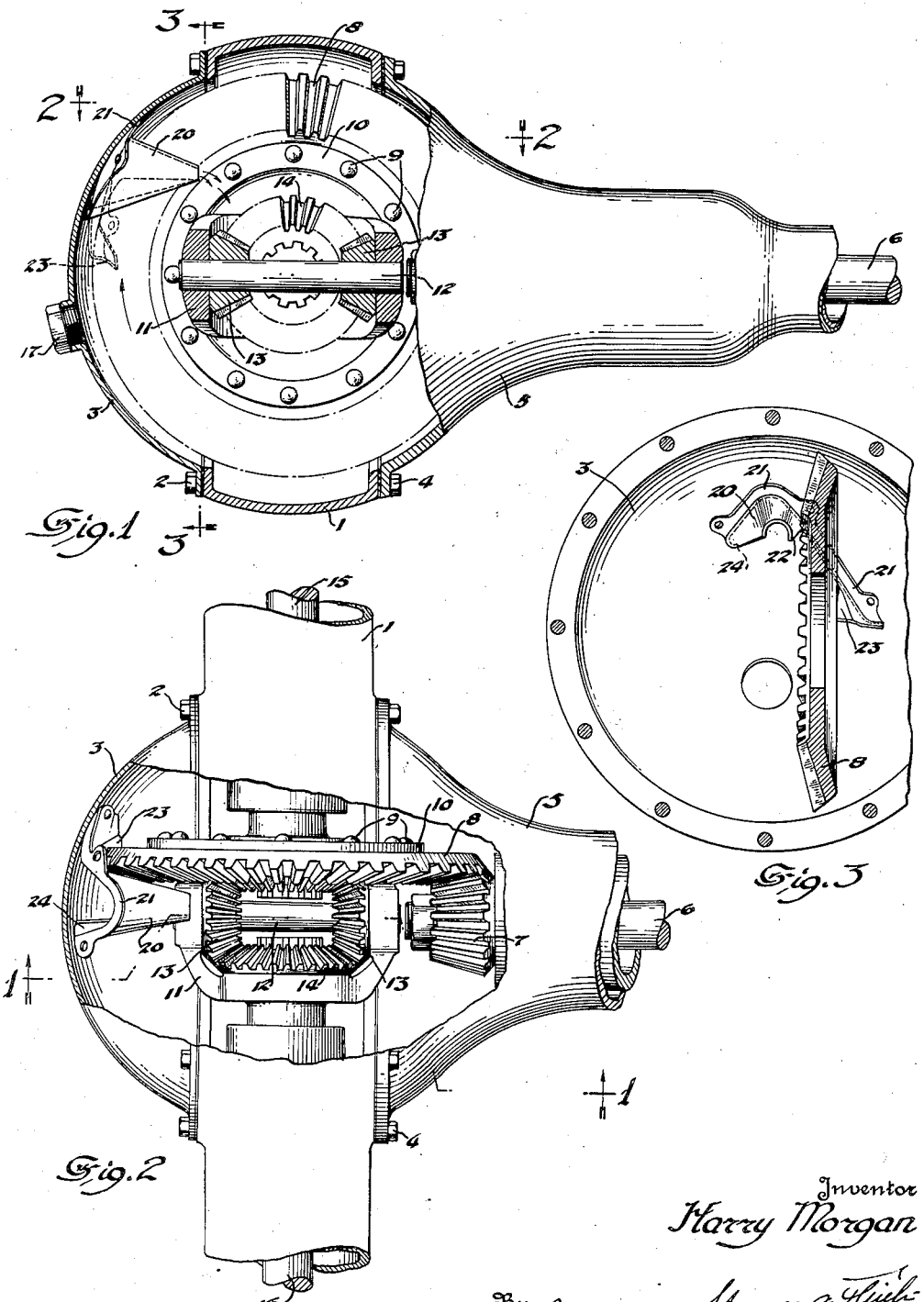
Inventor
Harry Morgan
By Blackmore, Spencer & Fluke
Attorneys Sept. 9, 1930.   H. MORGAN   1,775,623
LUBRICATING REAR AXLE DIFFERENTIAL
Filed Sept. 1, 1928   2 Sheets-Sheet 2
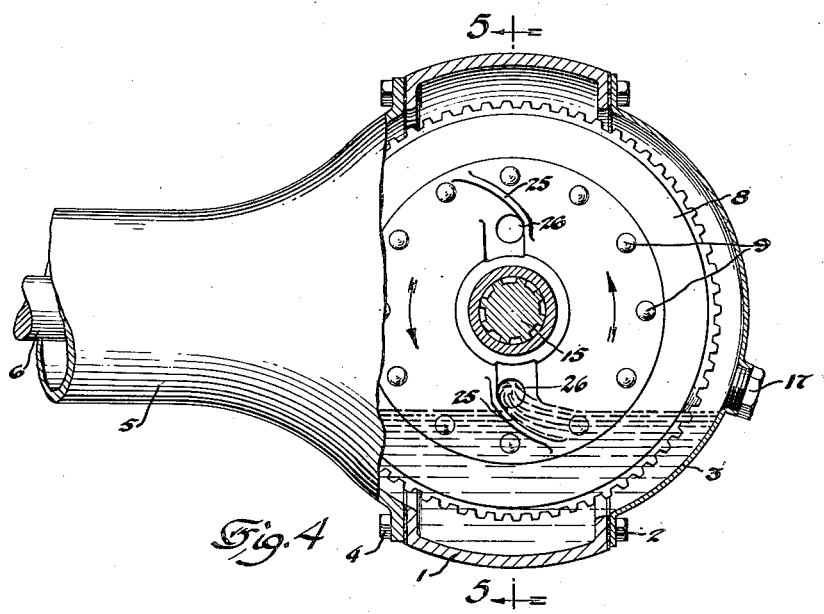
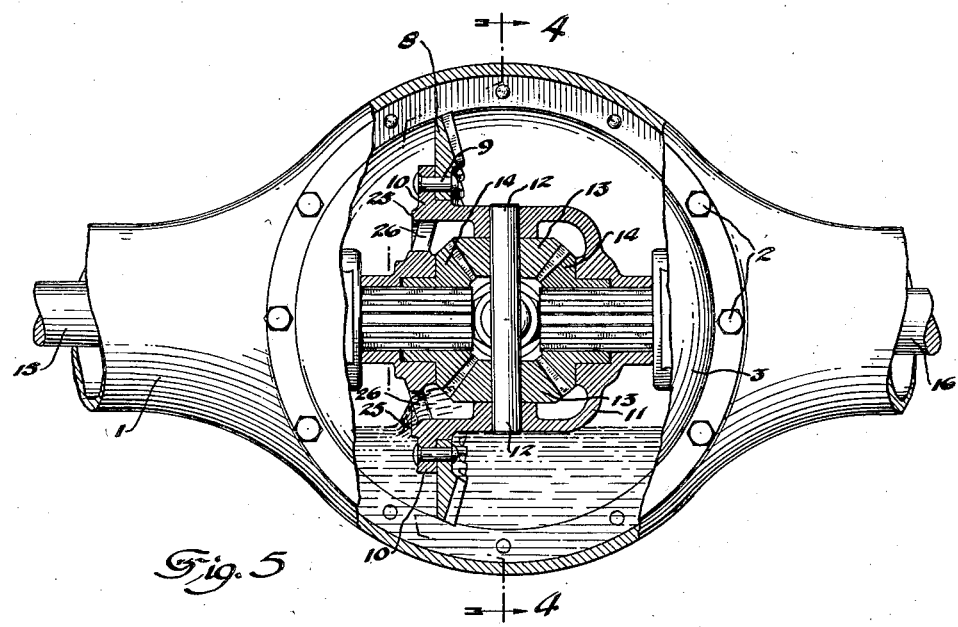
Inventor
Harry Morgan
By Blackmore, Spencer & Flint
Attorneys Patented Sept. 9, 1930

1,775,623

UNITED STATES PATENT OFFICE

HARRY MORGAN, OF FLINT, MICHIGAN, ASSIGNOR TO GENERAL MOTORS CORPORATION, OF DETROIT, MICHIGAN, A CORPORATION OF DELAWARE

LUBRICATING REAR-AXLE DIFFERENTIAL

Application filed September 1, 1928. Serial No. 303,393.

This invention relates to power transmission devices such as differential gearing for the drive axle of a motor vehicle and more particularly to an arrangement for insuring thorough lubrication of the parts.

It is an object of the invention to provide a rear axle assembly wherein the movement of the parts will cause lubricant contained in the housing to be delivered to the bearing surfaces in quantity sufficient to provide positive lubrication at all times, thereby minimizing wear and reducing the tendency for the parts to gall.

The invention will be more clearly understood upon reference to the accompanying drawing, wherein Fig. 1 is a view partly in section of a differential gear assembly in which the present invention is embodied and which is taken on line 1—1 of Fig. 2.

Fig. 2 is a top plan view with parts broken away, looking in the direction of the arrows on line 2—2 of Fig. 1.

Fig. 3 is a view taken on line 3—3 of Fig. 1.

Fig. 4 is a vertical sectional view of a differential assembly showing a modification and is taken on line 4—4 of Fig. 5.

Fig. 5 is a section taken on line 5—5 of Fig. 4.

Referring to the drawings, reference character 1 indicates the rear axle housing having an enlarged central portion at one side of which is removably secured by bolts 2, a cover plate 3, and to the other side of which is fastened by bolts 4 a torque tube 5. Within the torque tube is contained the drive or propeller shaft 6 carrying at its end the drive pinion 7 that meshes with ring gear 8 secured as by rivets 9 to an annular flange 10 on the differential frame or carrier 11. The frame 11 carries a shaft or pin 12 having mounted thereon a pair of differential pinions 13 in mesh with the side gears 14 keyed or splined on the ends of the axle sections 15 and 16, respectively.

Lubricant is introduced through an opening in the cover plate 3, closed by a plug 17, to a desired level, and normally the rotation of the ring gear through the lubricant supply is relied upon to splash oil or grease upon the differential gearing to lubricate the same. Obviously, this is not always an effective method of lubrication, particularly when the supply of grease falls low. To insure thorough lubrication of the parts, there is provided in the present case, a baffle device preferably stamped from sheet metal, comprising a spout or trough 20, having a base flange 21 riveted, welded or otherwise secured to the removable cover 3 and having scraper edges 22 and 23 that scrape off lubricant that clings or adheres on the opposite sides of the ring gear as it rotates through the lubricant supply in the bottom of the housing, the spout 20 directing such lubricant inwardly toward the center, where it falls into differential gear mechanism to lubricate the intermeshing teeth of the gears as well as the journal bearings therefor. The bottom of the spout at the side opposite the scraper edge 22 is preferably flanged inwardly as at 24 to obstruct the movement of the oil or grease downwardly and cause it to travel toward the nose of the spout. The deflector also serves to eliminate slinging of the grease by the ring gear laterally through the axle housing where it would eventually leak out at the end of the axle. While the excess grease is scraped off the ring gear there will be a sufficient amount left thereon to insure proper lubrication between the contacting teeth of the ring gear and pinion drive gear.

Another arrangement for directing grease to the interior of the differential frame and onto the moving surfaces of the gearing is illustrated in Figs. 4 and 5, wherein the frame 11 at one side is provided with a pair of integral curved vanes or baffles 25 that tend to scoop up lubricant during rotation of the ring gear and direct it through opening 26 in the frame to the interior thereof.

Various modifications and changes in the structure may be made as will be obvious to those skilled in the art.

I claim:

1. For use with differential mechanism in the drive axle of a motor car or the like, constituted by a driven ring gear that is rotatable thru a supply of lubricant contained in the axle housing and associated differential gearing between axle sections located above the normal lubricant level, a baffle device having a notched portion adapted to receive a peripheral portion of the ring gear with its edges in scraping relation with opposite sides of the ring gear, and an inwardly extended deflector portion to direct lubricant carried by the ring gear upon its rotation thru the lubricant supply and scraped from opposite sides by said scraping edges, to the differential gearing.

2. In a drive axle for motor vehicles or the like, an axle housing adapted to contain lubricant, a driving pinion extending into the housing, a ring gear driven by said pinion and rotatable thru the lubricant, an open carrier frame for differential gearing associated with the ring gear and located above the lubricant level, and a deflector spout of substantially U-shape in section and inwardly tapered with one leg of the U provided with a notch into which the ring gear extends, whereby lubricant carried by the ring gear is collected and directed by the deflector into the differential carrier frame.

3. In a drive axle for motor vehicles or the like, an axle housing adapted to contain lubricant, a driving pinion extending into the housing, a ring gear driven by said pinion and rotatable thru the lubricant, an open carrier frame for differential gearing associated with the ring gear and located above the lubricant level, and a deflector in the upper part of the housing extending inwardly on both sides of the ring gear to scrape lubricant from opposite sides of the ring gear and direct it into the open differential carrier frame.

4. In a drive axle for motor vehicles or the like, an axle housing adapted to contain lubricant, a driving pinion extending into the housing, a ring gear driven by said pinion and rotatable thru the lubricant, an open carrier frame for differential gearing associated with the ring gear and located above the lubricant level, and a deflector spout of substantially inverted U-shape in section and tapered inwardly with one leg positioned adjacent the ring gear to scrape lubricant therefrom for deflection by the spout into the open frame.

5. The structure of claim 4, wherein the other leg of the U-shaped spout carries a lateral flange that projects into the open space between the legs.

6. In a drive axle for motor vehicles or the like, an axle housing adapted to contain lubricant, a beveled ring gear rotatable thru the lubricant, a laterally disposed differential carrier above the lubricant level having an opening therein, and a tapered deflector spout in the upper part of the housing, having a scraper edge lying closely adjacent to and extending in substantially parallel relation with and across the teeth of the beveled gear to deflect lubricant carried by the gear from the spout end into the opening of the differential carrier.

7. In a drive axle for motor vehicles or the like, an axle housing adapted to contain lubricant, a beveled ring gear rotatable thru the lubricant, a laterally disposed differential carrier above the lubricant level, and a substantially U-shaped deflector positioned adjacent and across the ring gear teeth, and tapered inwardly with its taper in substantial correspondence with the inclination of the beveled teeth, to direct lubricant drawn upwardly upon ring gear rotation, into the carrier.

In testimony whereof I affix my signature.

HARRY MORGAN.